(12) United States Patent
Izabel et al.

(10) Patent No.: US 7,029,057 B2
(45) Date of Patent: Apr. 18, 2006

(54) MOTOR VEHICLE EQUIPMENT MODULE

(75) Inventors: Vincent Izabel, Brunoy (FR); Laurent Simon, Richebourg (FR)

(73) Assignee: Valeo Systèmes d'Essuyage, (FR)

( * ) Notice: Subject to any disclaimer, the term of this patent is extended or adjusted under 35 U.S.C. 154(b) by 0 days.

(21) Appl. No.: 10/482,097

(22) PCT Filed: Jun. 6, 2002

(86) PCT No.: PCT/FR02/01946

§ 371 (c)(1),
(2), (4) Date: Dec. 23, 2003

(87) PCT Pub. No.: WO03/002363

PCT Pub. Date: Jan. 9, 2003

(65) Prior Publication Data

US 2004/0174042 A1    Sep. 9, 2004

(30) Foreign Application Priority Data

Jun. 29, 2001   (FR) .................................. 01 09107

(51) Int. Cl.
*B62D 25/06* (2006.01)

(52) U.S. Cl. .................... 296/152; 296/56; 296/146.8; 296/146.1

(58) Field of Classification Search ................ 296/56, 296/152, 146.8, 106, 146.1; 49/502; 293/128
See application file for complete search history.

(56) References Cited

U.S. PATENT DOCUMENTS

| 4,831,503 A | | 5/1989 | DeSantis et al. |
| 6,102,470 A | | 8/2000 | Heim et al. |
| 6,328,359 B1 | * | 12/2001 | Pacella et al. ............. 293/128 |
| 6,509,832 B1 | * | 1/2003 | Bauer et al. ............. 340/425.5 |
| 6,637,801 B1 | * | 10/2003 | Eustache et al. ............ 296/106 |
| 2001/0022549 A1 | * | 9/2001 | Mauel et al. ............. 340/5.72 |

FOREIGN PATENT DOCUMENTS

| DE | 43 21 389 A1 | 1/1995 |
| EP | 0 967 098 A2 | 12/1999 |
| FR | 2 796 915 | 2/2001 |

* cited by examiner

*Primary Examiner*—Joseph D. Pape
(74) *Attorney, Agent, or Firm*—Osha Liang LLP (57) ABSTRACT

The invention relates to an external module for equipping a motor vehicle of the type that includes components to control the locking of the closed position of a movable part, such as a tailgate, with respect to a fixed part of the vehicle structure. The external equipment module includes a sealed external body which is received in a complementary housing in the movable part in which it is mounted from the outside of the vehicle.

22 Claims, 4 Drawing Sheets

MOTOR VEHICLE EQUIPMENT MODULE

BACKGROUND

The present invention concerns a module equipping a motor vehicle.

The invention concerns more particularly an external module equipping a motor vehicle of the type which comprises means of controlling the locking of the closed position of a movable part, such as a tailgate, with respect to a fixed part of the vehicle structure.

According to a design normally used in automobile manufacture, and in particular private cars, the rear transverse part of the vehicle consists of a movable part or opening element, in particular a tailgate, which is mounted so as to be articulated with respect to the vehicle body, more generally about an upper horizontal transverse articulation axis, or about a vertical lateral axis.

Many components can be fixed to the rear door of a motor vehicle, in particular when it is a large tailgate.

Thus the tailgate can support, in addition to its closure and locking system, a number plate and its illumination systems, but also possibly the third regulatory brake light, or even all or some of the rear indicator light units, as well as the rear window which is, where applicable, itself mounted so as to be articulated with respect to the tailgate.

All the components, which are of course produced independently of the bodywork piece which constitutes the tailgate, must therefore be mounted on this tailgate when the vehicle is assembled or prior to the mounting of the tailgate on the vehicle body.

However, increasing the number of components gives rise to an increase in assembly time and gives rise to increased risks of assembly defects.

Moreover, it is necessary to provide, for each of the electrical components, firstly the electrical supply, secondly the means of controlling these components, and finally monitoring means which make it possible in particular to give information on the state of functioning of the components either to the driver, for example by means of indicator lights on the dashboard, or to a central electronic vehicle management unit.

In order to simplify and make reliable the various mounting and assembly operations, many designs having recourse to an equipment module attached to the rear element, in particular to a door in the form of a tailgate, have already been proposed.

In all the known designs, the equipment module, or an equivalent sub-assembly comprising in particular means of controlling the locking of the closed position of the door, are in the form of a relatively bulky sub-assembly which is mounted on the rear element of the vehicle from the inside thereof using various fixing means which make the mounting and fixing operations lengthy and complex. According to these known designs, it is in addition particularly difficult to mount the equipment module when the rear element is a fixed element belonging to the vehicle body, or to mount the equipment module inside a tailgate when the latter is already mounted articulated on the vehicle body.

In addition, the electrical components require electrical connections for their supply, their control, and their monitoring. However, in the modules of a known type, moisture can frequently be deposited on the conductive elements of electrical connections thus creating premature oxidation of the elements which may cause malfunctioning of the electrical components.

SUMMARY

So as to resolve these problems, the invention proposes an external module equipping a motor vehicle of a type which comprises means of controlling the locking of the closed position of a movable part, such as a tailgate, with respect to a fixed part of the vehicle structure, characterised in that it comprises a sealed external body which is at least partially received in a complementary housing in the movable part in which it is mounted from the outside of the vehicle.

According to other characteristics of the invention, the movable part comprises an internal bearing structure and an external bodywork panel, and the external body has a profile and shape complementary to those of the housing which receives them and which, in the mounted position, constitutes an attached part of the external cladding panel;

the external body is a piece moulded from plastics material;

the external body consists of a rear shell closed sealingly by a front cover in the general form of a plate;

a joint is interposed between the contacting faces of the front cover and rear shell closed so as to provide impermeability of the body;

the cover and closed rear shell are crimped and/or fitted together elastically so as to provide impermeability of the external body;

the external body carries elements for fixing the equipment module comprising fixing rods which extend parallel to the direction of mounting the equipment module;

the means of controlling the locking of the closed position of the movable part comprise a control element movable between an unlocking position and a locking position;

the movable element is a flexible deformable membrane which extends opposite an orifice in the body and whose internal wall is conductive so that, when the membrane is deformed towards the inside of the body, the internal wall comes into contact with an electrical conductive element, so as to modify the electrical state of an electrical circuit and to control the locking of the movable part;

the means of controlling the locking of the closed position of the movable part comprise a receiving element, such as an antenna, intended to receive information representing the locking control transmitted by the external remote control means;

the external equipment module comprises means forming a handle opening the movable part;

the external equipment module comprises at least one other component;

one of the components comprises a light source;

the light source comprises a unit for illuminating the inside of the passenger compartment and/or the vehicle boot;

the lighting unit is separable from the external body so as to form a movable lighting source;

the light source comprises a rear indicator light, in particular a light indicating braking, change of direction or reversing, or a fog light, or part of such a light;

the light source comprises a unit illuminating the outside of the vehicle, such as a unit illuminating the number plate;

one component is a device for preventing breaking into the external casing;

one component comprises an electronic vision system, in particular a camera, which is oriented towards the outside of the vehicle and which provides information representing the external environment situated opposite the electronic vision system;

one component comprises a proximity detection system, in particular for assistance in parking the vehicle;

one component comprises a brightness sensor;

one component comprises pre-positioning means which make it possible to keep the module in position with respect to the internal bearing structure before they are fixed;

the locking means and/or at least one of the components are electrically connected to a circuit carrier plate;

the body is made from electrically insulating material and is moulded on around at least one track or cable made from electrically conductive material for the electrical supply, locking means and/or at least one component, or for the exchange of signals with this element.

BRIEF DESCRIPTION OF THE DRAWINGS

Other characteristics and advantages of the invention will emerge from a reading of the following detailed description, for an understanding of which reference will be made to the accompanying drawings, amongst which.

DETAILED DESCRIPTION

Figure 1:
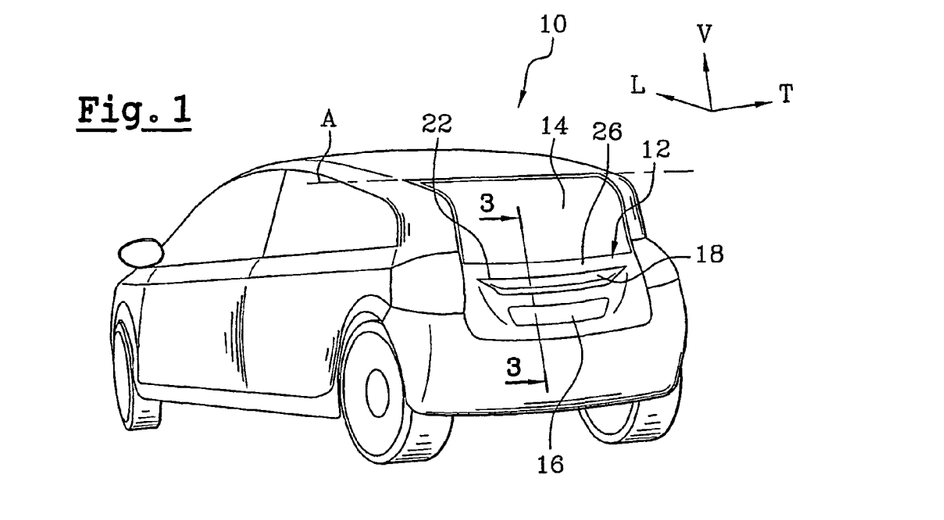
FIG. 1 depicts in perspective a motor vehicle equipped with an external equipment module produced in accordance with the teachings of the invention.
Figure 2:
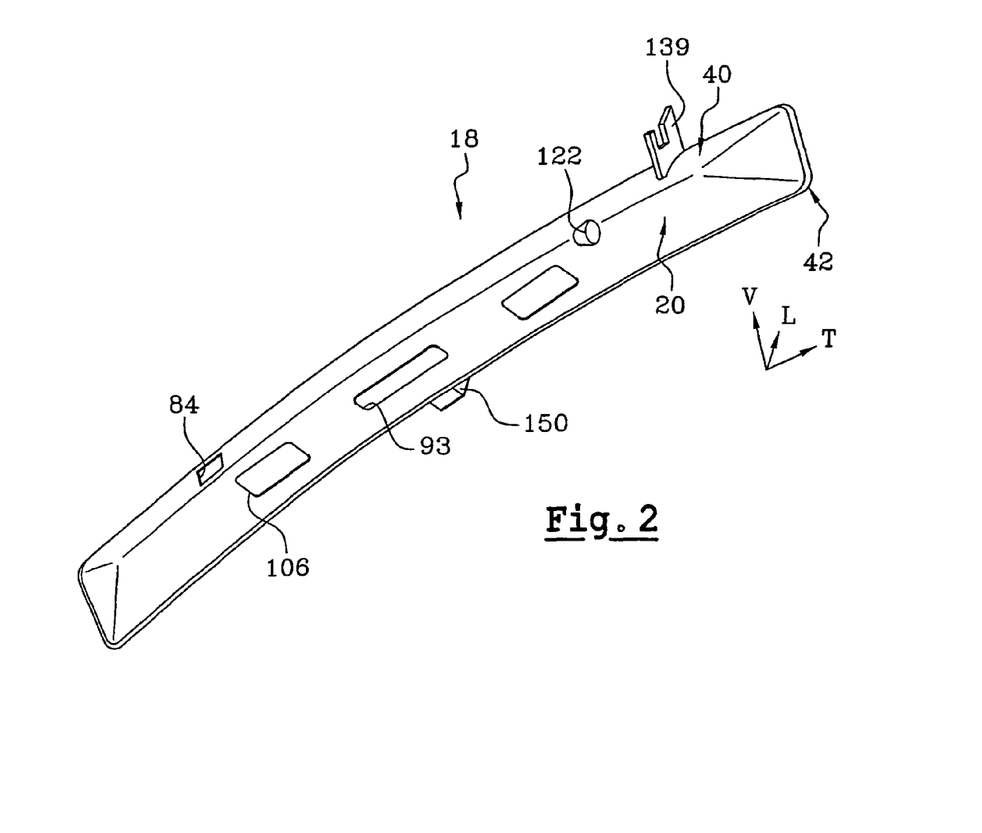
FIG. 2 depicts in perspective to a large scale an external equipment module produced in accordance with the teachings of the invention.

In the description which follows, the terms transverse, longitudinal and vertical will be used, non-limitingly, with reference to the corresponding three axes "T", "L" and "V" indicated in FIGS. 1 and 2.

In the description the identical, analogous or similar elements will be designated by the same reference figures.

FIG. 1 depicts a motor vehicle 10 which in particular consists of a movable part or tailgate 12 which comprises a solid bottom part and an open top part constituting a frame intended to receive, in a known manner, a rear glazed panel 14 which may be a fixed rear window or a rear window articulated on the tailgate 12.

The solid bottom part comprises here in particular a registration or licence plate 16 as well as a rear external module 18.

The tailgate 12 is mounted articulated with respect to the vehicle structure about a transversely oriented axis A. Thus opening the tailgate consists of making it pivot upwards from its closed position depicted in FIG. 2 towards an open position, not shown.

By way of variant, for another model of vehicle, the tailgate can be mounted articulated with respect to the vehicle structure about a vertically oriented axis. In this case, opening the tailgate is achieved laterally.

In accordance with the invention, the external module 18 comprises an impervious external body 20 which is received in a complementary housing 22 in the tailgate 12 in which it is mounted from the outside of the vehicle 10.

According to its known general design, the tailgate 12 consists of an internal bearing structure 24, made from bent and welded pressed sheet metal, and an external cladding panel 26 which is for example an external bodywork skin fixed to the bearing structure 24.

Figure 3A:
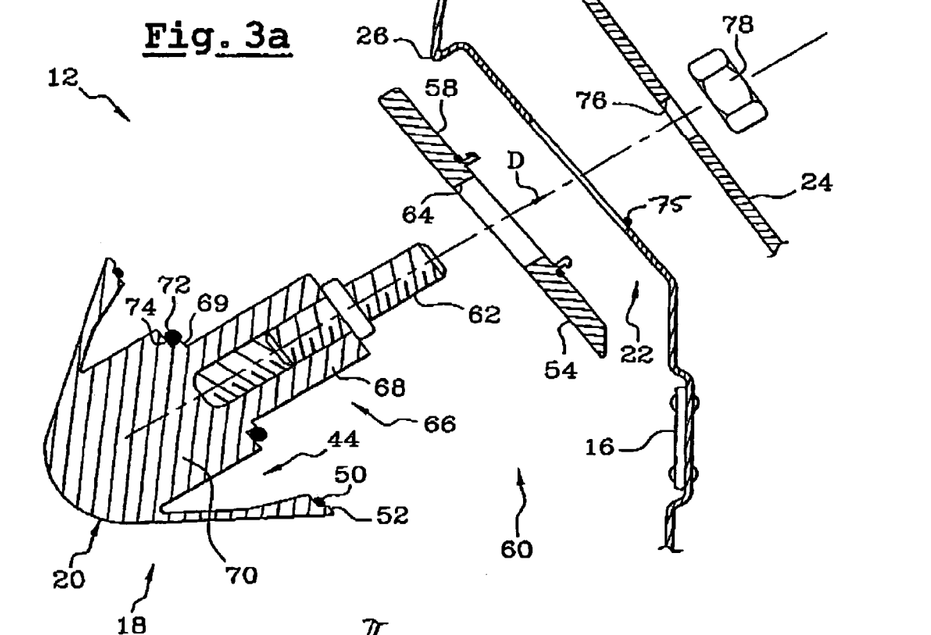
FIG. 3a is a view, in exploded longitudinal section along the line 3—3 depicted in FIG. 1, of the module produced in accordance with the teachings of the invention and of part of the tailgate.
Figure 3B:
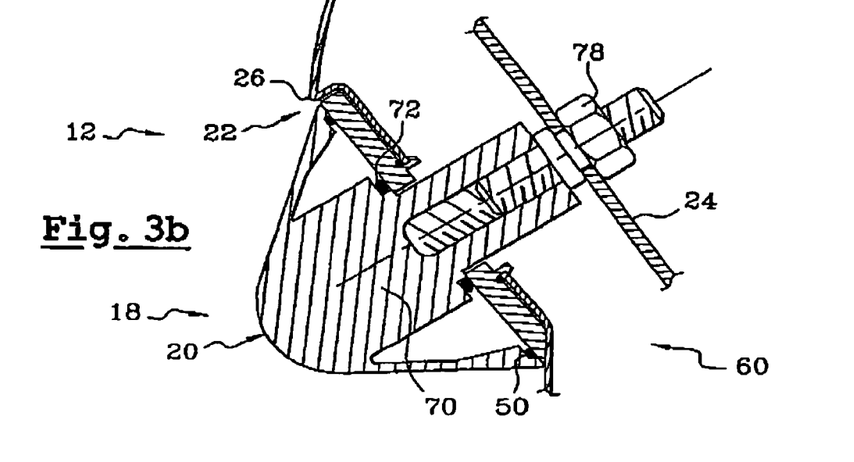
FIG. 3b is a view, in longitudinal section assembled along the line 3—3 depicted in FIG. 1, of the module produced in accordance with the teachings of the invention and part of the tailgate.

The general profile and the external shape of the external body 20 are complementary to those of the housing 22, and the other surrounding elements, so as to allow the mounting of the equipment module 18 in the housing 22 of the tailgate 10, from rear to front, in the mounting direction D indicated in FIG. 3a.

Thus, in the mounted position, the external body 20 constitutes an attached part of the external cladding panel 26.

In accordance with the teachings of the invention, the mounting of the impervious external body 20 of the equipment module 18 is effected thus on the tailgate 12 from the outside, that is to say such a mounting is particularly easy and can be effected on the rear part of the vehicle, in particular on its tailgate 12, without having to access the inside of the passenger compartment.

The design of the equipment module 18 will now be described in more detail, in particular with reference to FIGS. 2 to 6.

The external body 20 is advantageously a piece moulded from plastics material.

The body 20 consists here of a rear shell 40 of elongate shape transversely and of substantially triangular longitudinal section. The rear shell 40 comprises a rear face 54 which is open and which, in the assembled position of the external body 20, is sealingly closed by a front cover 42 in the general form of a plate.

The rear shell 40 delimits an internal cavity 44 which is intended to receive components of the module 18.

The impermeability of the body 20 can be achieved in several ways.

One of them consists of interposing a seal 50 between the front face 52 of the rear shell 40 and the rear face 54 of the front cover 42. The seal 50 is received in a groove produced on the periphery of the front face 52 of the rear shell 40.

The sealing of the external body 20 can also consist of crimping, welding, gluing or elastically fitting together the rear shell 40 and the front cover 42.

So as to facilitate the assembly of the rear shell 40 and the cover 42, the two elements can comprise complementary elastic fitting-together means, not shown.

Thus the rear shell 40 can comprise a tubular element, in the orifice of which a complementary element, which extends from the rear face 54 of the cover 42 in the axial direction of the orifice in the tubular element, enters and deforms elastically.

This makes it possible to hold together the rear shell 40 and the front cover 42 before the external body 20 is mounted on the tailgate 12.

The mounting of the external body 20 on the tailgate 12 is obtained by two fixing elements 60 which comprise here fixing rods 62 which extend from the inside of the rear shell 40 towards the front in a direction parallel to the direction D of mounting the external module 18 on the vehicle 10.

The fixing elements 60 pass through the cover 42 through two orifices 64.

So as to position the cover 42 with respect to the shell 40, the fixing rods 62 are carried by a stepped cylindrical foot 66.

The front step 68 has a diameter corresponding substantially to the diameter of the corresponding orifice 64. The rear face 54 of the cover 42 coming into abutment against the radial shoulder 69 which connects the front step 68 to a rear step 70 with a greater diameter.

The radial shoulder 69 extends in a transverse plane which corresponds to the front face 52 of the rear shell 40.

The impermeability of the external body 20 at the orifices 64 can be obtained by O-ring seals 72 which are arranged in annular grooves 74 in the radial shoulders 69.

When the external body 20 is closed, its mounting with the tailgate 20 can consist of inserting the fixing rods 62 in holes 75 and 76 in the external cladding panel 26 and the internal bearing structure 24 respectively, and then locking their movements by means of nuts 78 from the internal front face of the tailgate 12.

So as to facilitate assembly, the external body 20 can comprise pre-positioning and holding means which make it possible to hold it in position, with respect to the internal carrying structure 24, when the fixing rods 62 are inserted in the holes 76.

Figure 5:
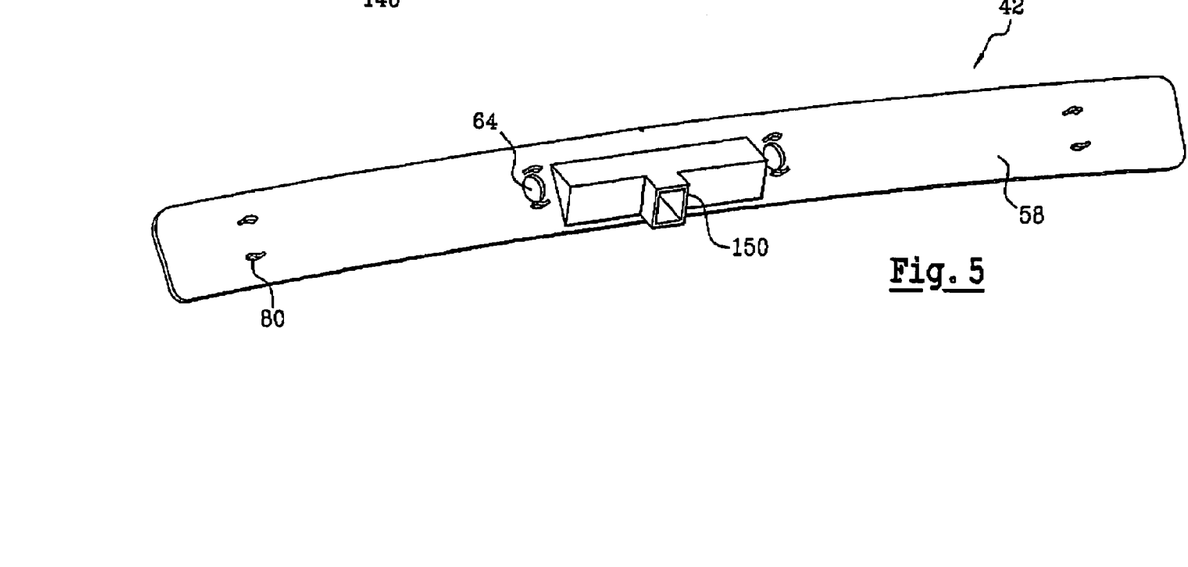
FIG. 5 depicts in perspective the front closure cover of the rear shell of the external body of the equipment module produced in accordance with the teachings of the invention.
Figure 6:
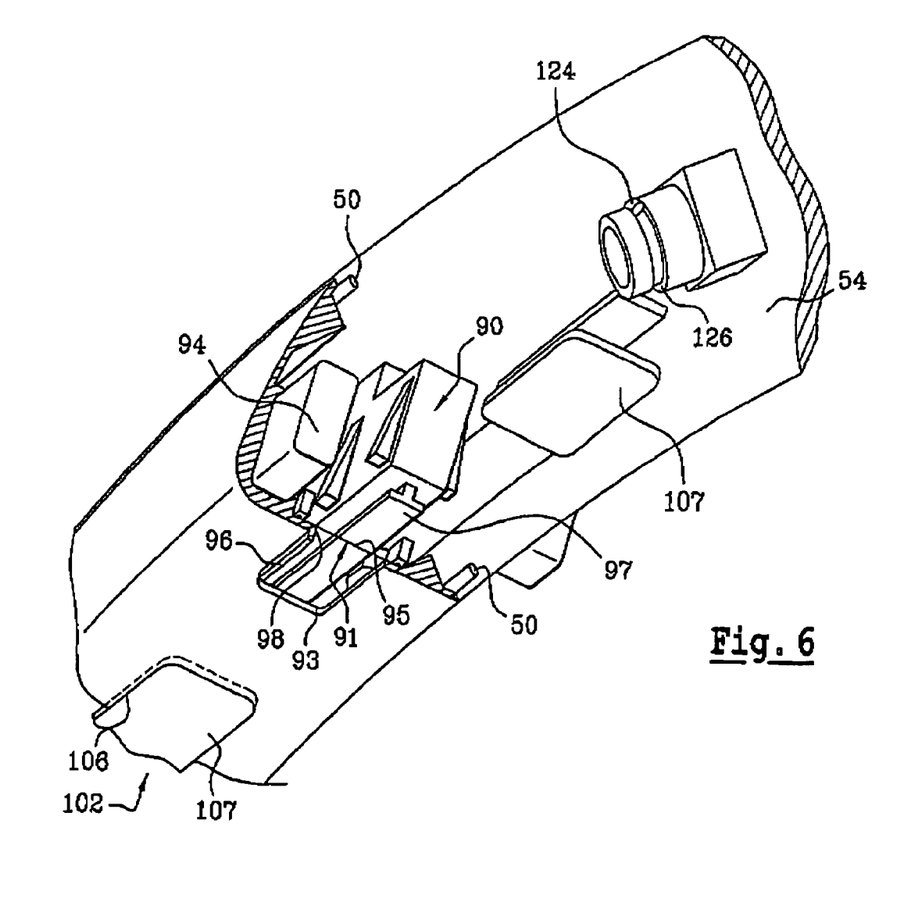
FIG. 6 is a view, to a large scale, in perspective with partial cutaway of material, of the external body of the equipment module produced in accordance with the teachings of the invention.

These pre-positioning and holding means can consist of elastically deformable elements such as hooks 80, depicted in FIGS. 3 and 5, which extend from the front face 58 of the cover 42 in the assembly direction D.

Thus, when the external body 20 is mounted on the tailgate 12, it is held by the hooks 80 which cooperate in particular with the free edges of the holes 75 in the external cladding panel 26.

This makes it possible to achieve the screwing of the nuts 78 during a subsequent step of assembling the tailgate 21 or the vehicle 10, for example a step requiring the opening of the tailgate 12.

According to a variant, the holes 76 in the bearing structure 24 are provided with automatic attachment and fixing means, not shown, such as claw systems or any other equivalent system, so as to allow mounting and fixing in the direction D without having to act subsequently, that is to say without having to act from the inside of the vehicle in order to provide definitive fixing, this fixing being obtained, in the direction D, "automatically" when the external body 20 is fitted in place in the housing 22.

The external body 20 comprises means of controlling the locking of the closed position of the tailgate 12.

The means of controlling the locking can, without departing from the scope of the invention, lock the other movable parts of the vehicle such as the doors. They can also inhibit the vehicle engine starting circuits.

The control means can comprise a control element able to move between an unlocking position and a locking position, and in a known fashion they can consist of a barrel which cooperates with a key so as to lock the movement of the tailgate opening lock.

The tailgate opening lock can be a button on which the user presses in order to cause the opening of the tailgate 12.

Figure 4:
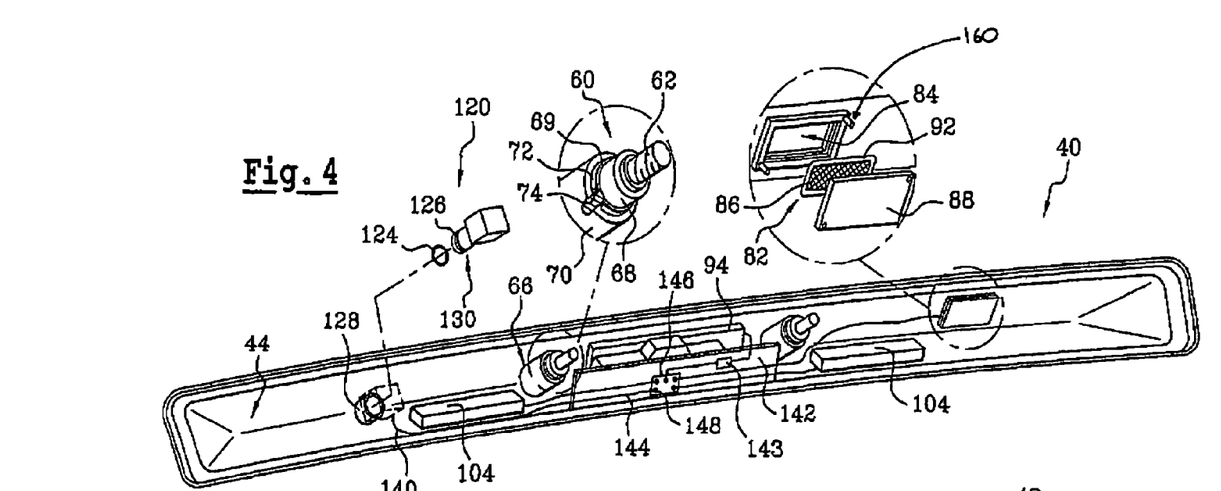
FIG. 4 depicts in perspective the interior of the closed rear shell of the external body of the equipment module produced in accordance with the teachings of the invention.

The movable control element can also comprise, in accordance with FIG. 4, a flexible deformable membrane 82 which extends opposite an orifice 84 in the external body 20, here more particularly the shell 40, and whose internal wall 86 is conductive so that, when the membrane 82 is deformed towards the inside of the body 20, the internal wall 86 comes into contact with an electrically conductive element 88 and modifies the electrical state of an electrical circuit in order to control the locking of the movable tailgate 12. Lacking the movable tailgate consists of immobilising the movable part or bolt of the electric lock 90.

By way of variant the locking control means comprise an element of the capacitive type.

So as to provide the seal on the external body 20 at the orifice 84, the membrane 82 advantageously comprises at its periphery a thicker part 92 which is gripped between the internal face of the rear shell 40 and a holding element which is advantageously the electrically conductive element 88 itself.

The electrically conductive element 88 can be fixed to the shell 40 by elastic deformation of fixing means, such as fingers 160 which extend from the internal face of the rear shell 40.

Such control means can allow the locking and unlocking of the closed position of the tailgate 12.

For reasons of security and to prevent unlocking not desired by the user, for example by an ill-intentioned individual or when the vehicle is being cleaned, it may be preferable for the control means of this type to allow only locking.

The means of controlling the locking of the closed position of the movable part can also comprise a receiving element, such as an antenna 94, intended to receive information representing the locking control transmitted by external remote control means, such as a badge or electronic key.

The rear shell 40 can be moulded onto the receiving element.

According to a variant, the receiving element can also be attached inside the rear shell 40.

The electric lock 90 functions here in a similar fashion to the means of controlling the locking of the closed position of the movable part 12, that is to say it comprises a flexible membrane 91 which closes off an orifice 93 in the shell 40 and whose internal face 95 is electrically conductive so that, when it is deformed towards the inside, it comes into contact with a conductive element 97 of the electric lock 90 to allow opening of the tailgate 12.

The impermeability of the orifice 93 can also be achieved in a similar fashion to that of the orifice 84.

The external body 20 comprises here means 96 forming a handle for opening the tailgate 12. The means 96 consist of a rim which extends from the rear edge 98 of the orifice 93, allowing access to the electric lock 90.

Thus the user can, in a single movement, release the lock 90 and easily open the tailgate by a simple movement roughly oriented upwards, the end of his fingers coming into abutment against the rim 96.

The external module 18 can comprise other components. One of them can consist of a light source.

The light source can comprise a lighting unit, not shown, for the inside of the passenger compartment and/or the vehicle boot 10.

The lighting unit is received inside the cavity of the rear shell 40.

According to a variant, the lighting unit is attached separably to the front face of the cover 42. They thus form a movable lighting source which the user can separate from the external body in order to orient the light beam with precision.

In this case, the lighting unit can be supplied by a flexible electric cable whose length determines the maximum area of manipulation of the unit.

The unit can also comprise a battery of accumulators. The lighting unit is then self-contained and can serve as a lamp known as a pocket lamp or torch.

When the lighting unit is attached to the external module 18, its battery of accumulators is electrically connected to an electrical source so as to recharge it electrically.

The light source can also comprise a rear indicator light, not shown, in particular a brake light, a direction indicator light, a reversing light or a fog light, or part of such a light. The light source can also comprise a lighting unit for the outside of the vehicle, such as a lighting unit 102 for the number plate 16.

Here the lighting unit for the number plate consists of two lighting elements 104 which emit light beams through areas 106 hollowed out in the shell 40 which are facing, here above, the number plate 16 and which are closed off by transparent elements 107 which can have specific optical properties.

The impermeability of the hollowed-out areas 106 is achieved in a known fashion, for example by O-ring seals, not shown, arranged between their internal peripheries and the external periphery of the transparent elements 107.

When the means of controlling the locking of the closed position of the tailgate 12 comprise the flexible membrane 91, the latter can be extended transversely inside the cavity of the shell 40 beyond the hollowed-out areas 106 so as to achieve their impermeability.

Another component can consist of an anti break-in device for the external body 20.

Such a device can be produced in several ways.

One of them consists of electrically connecting a conductive area of the module 18 to a facing conductive area of the vehicle structure 10. When the module 18 is fixed to the vehicle structure 10, an electric current flows between the vehicle itself and the equipment module 18 through the said conductive areas. When there is an attempt to break into the vehicle, by pulling away the conductive module 18, the module 18 and the structure 10 are separated from each other, which opens the electrical circuit produced and in particular triggers an anti break-in device, such as an audible alarm, and/or inhibits the vehicle motor starting circuits.

Another component can comprise an electronic vision system 120, in particular a camera, which is oriented towards the outside of the vehicle 10 and which provides information representing the external environment situated facing the electronic vision system.

The shell 40 comprises an opening 122 which enables the electronic optical vision system 120 to open out towards the outside of the vehicle.

The electronic optical vision system 120 is oriented towards the rear of the vehicle. It supplies information representing the external environment situated opposite.

In order to protect the electronic vision system 120, in particular from soiling and the splashing of elements such as gravel, a transparent protective cover, not shown, is arranged between the outside of the vehicle and the electronic vision system 120.

A damping element, not shown, can be interposed between the electronic vision system 120 and the shell 40 in order to absorb the vibration of the rear door so that the electronic vision system 120 is as stable as possible and supplies the user with precise information.

The seal at the corresponding opening 122 is obtained by the arrangement of a seal 124 of circular shape overall in a groove 126 provided for this purpose in an external cylindrical wall of the electronic vision system 120.

In order to increase the efficacy of the seal 124 and optimise the precision of the positioning of the electronic vision system 120, a skirt 128 extends, towards the inside, from the internal face of the shell 40. It receives the rear free end 130 of the camera 120.

Electrical connections, not shown, supply it electrically but also transmit the information representing the external environment to a processing system, which then transmits the processed information to a display device on board the vehicle.

The display device supplies an image representing the external environment facing the electronic vision system 120. Thus the display device such as a control screen provides the driver with a view of the environment situated to the rear of the vehicle. Such an electronic optical vision system 120 associated with the display device makes it possible for example to replace the interior rear view mirror of the vehicle.

The processing system can also determine a parameter relating to an object in the external environment. The object can be another vehicle stopped or in movement.

The parameter can be the relative speed or the distance between the object and the vehicle. The electronic vision system 120 then assists the driver dining a maneuver, in particular in a parking space, by indicating to him the distance which separates the rear of his vehicle and the object situated to the rear.

Another component can also comprise a proximity detection system, not shown, in particular for assistance with parking the vehicle.

Another component can also comprise a brightness sensor, not shown.

When the vehicle comprises a device, not shown, for wiping the rear glazed panel by means of a windscreen wiper blade driven in alternating sweep, the external body 20 can also carry, on the external face of the shell 40, an element 139 forming a ramp, of known general design, which makes it possible to position the wiper arm in the parking position without the wiping rubber carried by the blade being in abutment against a surface of the vehicle.

The ramp 139 can be attached to the shell 40, partially embedded therein, or produced in one piece by moulding with the shell 40.

When the glazed panel 14 is articulated with respect to the tailgate 12, a component can consist of a lock for locking its closed position.

So as to be supplied electrically, the locking means and/or at least one of the components which require it are connected to an electrical power source, not shown, which can be a battery of accumulators or the vehicle alternator.

The electrical connections can be produced by electrically conductive wires 140 which supply one or more components of the module 18.

When the external body 20 is made from electrically insulating material it can be moulded around at least one track or cable made from electrically conductive material.

In both cases, the wires or tracks can be electrically connected to a circuit holder plate 142 to which their free ends are electrically connected.

The circuit holder plate 142 comprises tracks 144 made from conductive material which converge towards an area of reduced dimensions 146, so as to concern the connection areas 148.

The circuit holder plate 142 can also comprise electronic components, such as components 143 for controlling the antenna 94.

Advantageously, the circuit holder plate 142 is produced from flexible material which makes it possible to deform it, in particular to curve it, so as to occupy free areas of the cavity 44 in the shell 40 and to minimise its space requirement, as well as the dimensions of the module 18.

It is thus possible to electrically connect several components of the module 18 by means of a single connector, not shown, which is introduced into guidance and holding means 150 produced in the cover 42.

The exchange of signals of the components with an electronic control unit, not shown, which makes it possible for example to control or collect the information picked up, can be obtained in a similar fashion by wires and/or tracks which are connected to connection areas.

Advantageously, all the control or supply connection areas 144 are concentrated in the area 146 so that the module 18 is connected to a single connector.

So as to reduce the number of components of the module 18, the anti break-in device of the external body 24 can comprise the single connector. Thus, when the single connector is disconnected, it triggers the anti break-in device.

To reduce the number of wires and tracks, it is advantageous to use a multiplexing device which makes various information circulate in a single electrical conductor. Thus the same wire can connect several components together, in particular to supply them electrically and/or to control them.

What is claimed is:

1. An external module for equipping a motor vehicle of the type which comprises means of controlling the locking of a closed position of a movable part with respect to a fixed part of the vehicle,
    characterised in that the external module comprises a sealed external body which is at least partially received in a complementary housing in the movable part in which the external module is mounted from the outside of the vehicle,
    wherein the sealed external body comprises a rear shell closed sealingly by a front cover in the general form of a plate, and
    wherein the sealed external body encapsulates the means of controlling the locking of the closed position of the movable part.

2. The external module for equipping the motor vehicle according to claim 1, characterised in that the movable part comprises an internal bearing structure and an external bodywork panel, and in that the sealed external body has a profile and shape complementary to those of the complementary housing which received the external module and which, in a mounted position, constitutes an attached part of the external bodywork panel.

3. The external module for equipping the motor vehicle according to claim 1, characterised in that the sealed external body is a piece molded from plastic material.

4. The external module for equipping the motor vehicle according to claim 1, characterised in that a seal is interposed between the front cover and the rear shell so as to make the sealed external body impermeable.

5. The external module according to claim 1, characterised in that the front cover and the rear shell are crimped and/or elastically fitted together so as to provide the seal on the sealed external body.

6. The external module according to claim 1, characterised in that the sealed external body carries fixing elements for the external module comprising fixing rods which extend parallel to the direction of mounting of the external module.

7. The external module for equipping the motor vehicle according to claim 1, characterised in that the means of controlling the locking of the closed position of the movable part comprises a control element able to move between an unlocking position and a locking position.

8. The external module for equipping the motor vehicle according to claim 7, characterised in that the control element is a flexible deformable membrane which extends opposite an orifice in the sealed external body and whose internal wall is conductive so that, when the membrane is deformed towards the inside of the sealed external body, the internal wall comes into contact with an electrically conductive element, so as to modify the electrical state of an electrical circuit and to control the locking of the movable part.

9. The external module for equipping the motor vehicle according to claim 1, characterised in that the means of controlling the locking of the closed position of the movable part comprises a receiving element configured to receive information representing a locking control transmitted by external remote control means.

10. The external module for equipping the motor vehicle according to claim 1, characterised in that the external module comprises means forming an opening handle for the movable part.

11. The external module for equipping the motor vehicle according to claim 1 further comprising an additional component.

12. The external module for equipping the motor vehicle according to claim 11, wherein the additional component comprises a light source.

13. The external module for equipping the motor vehicle according to claim 12, characterised in that the lighting source is separable from the sealed external body so as to form a movable lighting source.

14. The external module for equipping the motor vehicle according to claim 12, wherein the light source comprises at least one selected from the group consisting of a rear indicator light, a brake light a direction indicator light, a reversing light, and a fog light.

15. The external module for equipping the motor vehicle according to claim 12, characterised in that the light source comprises a unit for lighting the outside of the motor vehicle.

16. The external module for equipping to motor vehicle according to claim 11, wherein the additional component comprises an anti break-in device for the external module.

17. The external module for equipping the motor vehicle according to claim 11, wherein the additional component comprises an electronic vision system, wherein the electronic vision system includes oriented towards the outside of the motor vehicle and the camera is configured to provide information representing the external environment situated facing the electronic vision system.

18. The external module for equipping the motor vehicle according to claim 11, wherein the additional component comprises a proximity detection system configured to assist in parking the motor vehicle.

19. The external module for equipping the motor vehicle according to claim 11, wherein the additional component comprises a brightness sensor.

20. The external module for equipping the motor vehicle according to claim 2, further comprising a pre-positioning means configured to position the external module with respect to the movable part prior to mounting the movable part.

21. The external module for equipping the motor vehicle according claim 11, wherein the additional component is electrically connected to a circuit holder plate.

22. The external module for equipping the motor vehicle according to claim 1, characterised in that the sealed external body is made from electrically insulating material and is molded around at least one track or cable made from electrically conductive material for an electrical supply of the locking means.

* * * * *